(12) United States Patent
Picard et al.

(10) Patent No.: US 11,879,358 B2
(45) Date of Patent: Jan. 23, 2024

(54) TEMPERATURE BARRIER COATING FOR RIM-ROTOR

(71) Applicant: EXONETIK TURBO INC., Sherbrooke (CA)

(72) Inventors: Benoit Picard, Sherbrooke (CA); Jean-Sebastien Plante, Sherbrooke (CA); Mathieu Picard, Sherbrooke (CA)

(73) Assignee: EXONETIK TURBO INC., Sherbrooke (CA)

( * ) Notice: Subject to any disclaimer, the term of this patent is extended or adjusted under 35 U.S.C. 154(b) by 0 days.

(21) Appl. No.: 17/772,176

(22) PCT Filed: Nov. 27, 2020

(86) PCT No.: PCT/CA2020/051625
§ 371 (c)(1),
(2) Date: Apr. 27, 2022

(87) PCT Pub. No.: WO2021/102582
PCT Pub. Date: Jun. 3, 2021

(65) Prior Publication Data
US 2022/0381149 A1 Dec. 1, 2022

Related U.S. Application Data

(60) Provisional application No. 62/948,473, filed on Dec. 16, 2019, provisional application No. 62/944,047, (Continued)

(51) Int. Cl.
*F01D 5/28* (2006.01)
*C04B 35/44* (2006.01)
(Continued)

(52) U.S. Cl.
CPC .............. *F01D 5/284* (2013.01); *C04B 35/44* (2013.01); *C04B 35/48* (2013.01); *F01D 5/08* (2013.01);
(Continued)

(58) Field of Classification Search
CPC ..... F01D 5/02; F01D 5/08; F01D 5/12; F01D 5/14; F01D 5/18; F01D 5/225;
(Continued)

(56) References Cited

U.S. PATENT DOCUMENTS 4,017,209 A 4/1977 Bodman
7,578,655 B1 8/2009 Matheny
(Continued)

FOREIGN PATENT DOCUMENTS

WO 2018094536 A1 5/2018

*Primary Examiner* — Elton K Wong
(74) *Attorney, Agent, or Firm* — NORTON ROSE FULBRIGHT CANADA LLP (57) ABSTRACT

A rim-rotor assembly has an annular structure including a composite rim and a hub. Blades project from the hub, tips of the blades contacting the annular structure, the blades configured to be loaded in compression against the annular structure. A thermal barrier is in the annular structure, the thermal barrier defining at least part of a radially inward surface of the annular structure. The tips of the blades contact the thermal barrier, the thermal barrier being a thermal barrier coating.

15 Claims, 10 Drawing Sheets

Related U.S. Application Data filed on Dec. 5, 2019, provisional application No. 62/941,832, filed on Nov. 28, 2019.

(51) Int. Cl.

| | | |
|---|---|---|
| *C04B 35/48* | (2006.01) | |
| *F01D 5/08* | (2006.01) | |
| *F01D 5/18* | (2006.01) | |
| *F01D 25/12* | (2006.01) | |

(52) U.S. Cl.
CPC .............. *F01D 5/18* (2013.01); *F01D 5/288* (2013.01); *F01D 25/12* (2013.01); *C04B 2235/3222* (2013.01); *C04B 2235/3225* (2013.01); *C04B 2235/3246* (2013.01); *C04B 2235/9607* (2013.01); *C04B 2237/121* (2013.01); *C10M 2201/0613* (2013.01); *F05D 2230/90* (2013.01)

(58) Field of Classification Search
CPC .......... F01D 5/284; F01D 5/288; F01D 25/12; C04B 35/44; C04B 35/48; C04B 2235/322; C04B 2235/3225; C04B 2235/3246; C04B 2237/121; C10M 2201/0613; F05D 2230/90
See application file for complete search history.

(56) References Cited

U.S. PATENT DOCUMENTS

| | | | | |
|---|---|---|---|---|
| 10,815,786 | B2* | 10/2020 | Hafner | .................... F01D 5/225 |
| 2008/0019835 | A1* | 1/2008 | McFeat | .................... F01D 5/141 |
| | | | | 416/189 |
| 2015/0044444 | A1* | 2/2015 | Gell | ......................... C23C 4/10 |
| | | | | 415/230 |
| 2016/0252250 | A1* | 9/2016 | Bunker | ..................... F01D 9/02 |
| | | | | 60/753 |
| 2016/0257618 | A1* | 9/2016 | Jordan | .................. C04B 35/505 |
| 2016/0348226 | A1* | 12/2016 | Chen | ....................... C23C 4/134 |

* cited by examiner

TEMPERATURE BARRIER COATING FOR RIM-ROTOR

CROSS-REFERENCE TO RELATED APPLICATION

The present disclosure claims the priorities of U.S. Patent Application Ser. No. 62/941,832, filed on Nov. 28, 2019, of U.S. Patent Application Ser. No. 62/944,047, filed on Dec. 5, 2019, and of U.S. Patent Application Ser. No. 62/948,473, filed on Dec. 16, 2019, all of which are incorporated herein by reference.

FIELD OF THE DISCLOSURE

The present disclosure relates to rim-rotor turbomachinery where the turbine is radially supported by a reinforced rim-rotor, for instance of composite such as carbon, that empowers the use of ceramics.

BACKGROUND OF THE INVENTION

Mobile applications require power sources that are compact, have minimal weight and volume. In addition, due to a variety of factors including global warming issues, fossil fuel availability and environmental impacts, crude oil price and availability issues, efficiency of a power source is a focus in the transportation industry. For the transportation industry, especially air transportation where reliability is critical, turbines are recognized as offering one of the best solutions. In a turbine, as a general principle, the higher the turbine inlet temperature is, the more efficient the turbine will be. Recuperated Brayton cycles are recognized to provide a better efficiency than simple Brayton cycle.

A challenge with increasing the temperature of a recuperated Brayton cycle lies in the turbine itself, where typical alloys require large amounts of cooling to be able to withstand high gas temperatures. This is even more challenging for small scale turbines (<1 MW) where film cooling is hard to implement and significantly reduces cycle efficiency. Attempts have been made to use ceramics, such as silicon nitride and silicon carbide, for gas turbines since these materials can withstand high temperatures, but due to their brittleness they show reliability issues. Prior attempts have been made to build ceramic turbines contained in a rim-rotor, such as U.S. Pat. No. 4,017,209, but such attempts do not propose a viable cooling solution for some materials such as composites. A composite rim-rotor is limited by glass transition for carbon-polymer composites, or oxidation for carbon-carbon composites. These attempts have also been limited to purely axial turbine designs, which do not take full advantage of the rim-rotor that could be used for hub-less designs allowing inversed radial, axial or mixed flow configurations that optimize the temperature distribution of the engine packaging by keeping the hot gases on one single side of the turbine wheel, therefore separating structural and thermal loops.

Furthermore, when considering rim-rotor machinery, there is a challenge in matching the displacement of the rim-rotor to the displacement of a rigid hub. The rim-rotor also needs to be thermally insulated from the hot combustion gases, with ceramics being a choice candidate due to their low conductivity and high temperature resistance.

Accordingly, there is a need for a compact turbine that can operate at high air preheat temperatures with limited instabilities or failures, that could be used in industrial (furnaces, heaters) and power applications such as distributed CHP, aerospace and automotive applications. For maximum efficiency and emissions benefits in power applications, this turbine would have the capacity of being used with rim-rotor ceramic turbomachinery allowing high combustion temperatures, and hence high cycle efficiency.

SUMMARY

Therefore, in accordance with an aspect of the present disclosure, there is provided a rim-rotor assembly comprising: an annular structure including a composite rim; a hub; blades projecting from the hub, tips of the blades contacting the annular structure, the blades configured to be loaded in compression against the annular structure; and a thermal barrier in the annular structure, the thermal barrier defining at least part of a radially inward surface of the annular structure, the tips of the blades contacting the thermal barrier, the thermal barrier being a thermal barrier coating.

Further in accordance with the aspect, for example, the annular structure includes a cooling ring between the composite rim and the thermal barrier.

Still further in accordance with the aspect, for example, the cooling ring defines cooling channels.

Still further in accordance with the aspect, for example, the cooling ring includes a metallic ring.

Still further in accordance with the aspect, for example, the cooling ring is made of a thermal barrier coating.

Still further in accordance with the aspect, for example, the cooling ring is made of a composite of fibers in a conductive matrix.

Still further in accordance with the aspect, for example, the blades are connected to the hub by sliding joints, and are biased into compression against the annular structure.

Still further in accordance with the aspect, for example, the blades have a bottom segment connected to the hub, and a top segment against the annular structure, the bottom segment and the top segment interconnected by a translational joint.

Still further in accordance with the aspect, for example, the composite rim includes carbon fibers in a matrix.

Still further in accordance with the aspect, for example, the matrix is made of one of cyanate ester, polyimide, phtalonitrile.

Still further in accordance with the aspect, for example, the thermal barrier coating includes a layer of yttrium-stabilized-zirconia or of yttrium aluminum garnet.

Still further in accordance with the aspect, for example, the layer has a thickness ranging between 300 μm up to 1500 μm, inclusively.

Still further in accordance with the aspect, for example, the layer has a porosity level between 10 and 30%, inclusively.

Still further in accordance with the aspect, for example, the layer is of yttrium-stabilized-zirconia, and has a density between 4.2 and 5.5 g/cc inclusively.

Still further in accordance with the aspect, for example, the layer is of yttrium aluminum garnet, and has a density between 3.2 and 4.2 g/cc inclusively.

Still further in accordance with the aspect, for example, the thermal barrier includes a bond layer between the layer and a remainder of the annular structure.

Still further in accordance with the aspect, for example, the bond layer has a thickness ranging between 75 to 150 μm, inclusively.

Still further in accordance with the aspect, for example, the bond layer is MCrAlY or NiAl.

Still further in accordance with the aspect, for example, the bond layer has a porosity ranging between 5 to 15% inclusively.

Still further in accordance with the aspect, for example, the thermal barrier includes an anti-friction layer radially inward of the layer.

Still further in accordance with the aspect, for example, the anti-friction layer has a thickness ranging between 25 to 100 µm, inclusively.

Still further in accordance with the aspect, for example, the anti-friction layer is boron nitride.

Still further in accordance with the aspect, for example, the anti-friction layer is at discrete separate zones opposite the tips of the blades.

Still further in accordance with the aspect, for example, the tips of the blades include an anti-friction layer.

Still further in accordance with the aspect, for example, the thermal barrier is annular.

Still further in accordance with the aspect, for example, the thermal barrier has a uniform thickness.

Still further in accordance with the aspect, for example, the thermal barrier has a non-uniform thickness.

Still further in accordance with the aspect, for example, the thermal barrier defines recesses for receiving the tips of the blades.

Still further in accordance with the aspect, for example, the thermal barrier is thicker opposite the tips of the blades.

DETAILED DESCRIPTION OF THE INVENTION

Figure 1:
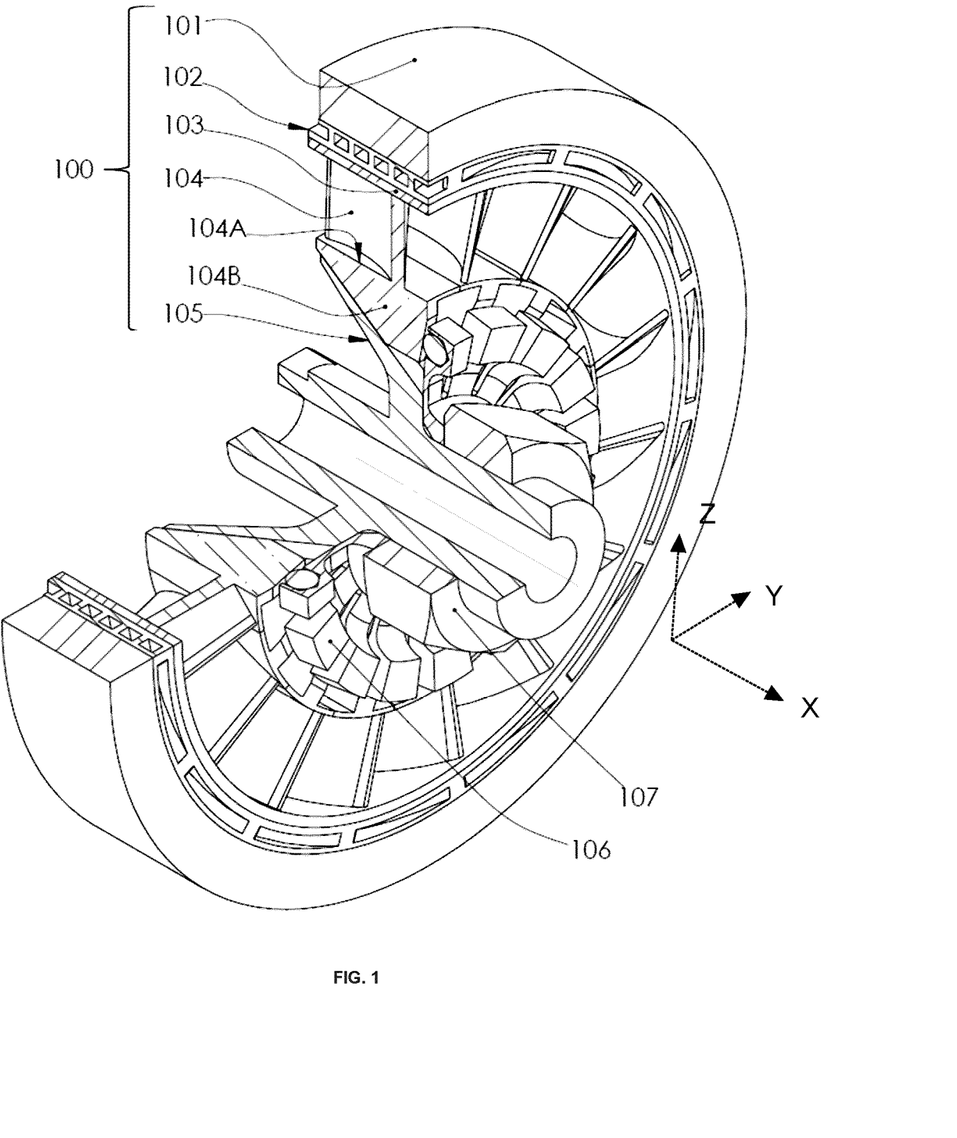
FIG. 1 is a perspective view, partly sectioned, of a rim-rotor turbomachine using a rim-rotor, an insulation substrate, ceramic blades with a sliding plane below the root, a matching sliding plane hub and a spring-mass retainer; where a thermal barrier coating has an even thickness, in accordance with an aspect of the present disclosure.

Referring to the drawings and more particularly to FIG. 1, a rim-rotor assembly that may be part of a rim-rotor turbomachine is illustrated at 100, in accordance with the present disclosure. The rim-rotor turbine wheel of FIG. 1 is one component of a turbomachine or turbine engine. In an exemplary use, a flow of hot gases expands through the rotating rim-rotor turbine wheel 100, which extracts power from the gases to convert the energy to a mechanical shaft power. This power may be transferred to a compressor, a generator, a propeller or fan (through a gearbox if required). The rim-rotor turbine wheel may be used in conjunction with other rim-rotor turbine wheels, or other turbine wheel types, on the same shaft of on different shafts in multi-spool turbine engine arrangement. Flow guiding vanes or inlet guide vanes may be used upstream of each rim-rotor turbine wheel to accelerate the flow tangentially in order for the rotor to convert the gas flow tangential momentum into mechanical power. For consistency, the expression "rim-rotor turbomachine" is used herein to describe the assembly of FIGS. 1-5 and 7-11, as the assembly shown may be part of a rim-rotor turbomachine 100, with other components of the rim-rotor turbomachine 100 being absent from the figures. The rim-rotor turbomachine 100 rotates about axis X, the axis X being normal to a plane incorporating axes Y and Z. The rim-rotor turbomachine 100 defines a surrounding annular structure, that may be referred to as a rim-rotor, as an outer shroud, surrounding ring, outer ring, outer annular, structure, etc. The surrounding annular structure rotates with blades about axis X. The surrounding annular structure may include various annular substructures, that may be referred to as layers, coats, coating, rings, etc, offering various functionalities to the rim-rotor, such as structural integrity, cooling, heat shielding, compressive loading, etc.

The annular surrounding structure may include a rim 101, also referred to as outer rim, or also as rim-rotor, though rim-rotor may include other annular components as expressed above and below. In a rim-rotor turbomachine, the rim 101 may generally have a diameter ranging from 7.5 cm and 80.0 cm. The rim 101 may be made of different materials. In an embodiment, the rim 101 is made of a composite material, the composite material being fibers in a polymer matrix. To maximize operational speed, minimize weight and provide structural rigidity, the fibers may be carbon fibers. For example, the carbon fibers may be a high modulus and/or high strength grade. A portion of the fibers (e.g. a substantial portion) may be oriented mostly tangentially (length of fibers along the circumference) to maximize the tangential properties of the composite rim 101. A lightweight matrix with proper compatibility with carbon fibers may be used to provide the properties required for high speed operation (e.g. RPM of 130,000, for a 400-500 m/s of tangential speed). A polymer matrix with high temperature resistance is preferred, from polymer families such as cyanate-ester, polyimide or phtalonitrile, but other polymers may be used depending on use conditions. As other possibilities, the rim 101 may be made of a ceramic matrix composite (CMC), a metal matrix composite (MMC), among possibilities.

As further part of the surrounding annular structure of the rim-rotor turbomachine 100, a cooling ring 102 may be integrally connected to the rim 101. The cooling ring 102 is positioned radially inward of the composite rim 101. The cooling ring 102 may include an air-cooled fin array and/or a conductive material, as detailed below. A low-conductivity layer or coating layer, referred to as a thermal barrier 103, may be integrally connected to the cooling ring 102 (if present) or to the composite rim 101. The thermal barrier 103 may be annular, and is radially inward of the composite rim 101 and of the cooling ring 102. In an embodiment, the surrounding annular structure of the rim-rotor turbomachine 100 includes the rim 101, the cooling ring 102 and the thermal barrier 103, from radially outward to radially inward. The thermal barrier 103 may define part or all of the radially inward surface of the surrounding annular structure. For example, the thermal barrier 103 may be discontinuous, such as where blades contact the surrounding annular structure (though the thermal barrier 103 may also be thicker at such locations).

In the rim-rotor turbomachine 100, the cooling ring 102 and the thermal barrier 103 define a structural insulation layer between a plurality of turbine blades 104 and the composite rim 101. This architecture may allow the use of ceramic material rated for high temperature use, for the blades 104. The blades 104 are mainly loaded in compression as retained by the composite rim 101 that takes the centrifugal loads in tensile stresses. The structural insulation between the blades 104 and the composite rim 101 must resist high compressive stresses while providing a high thermal gradient. The inner side, or hot side, of the thermal barrier 103 is in contact with the blades 104 at an elevated temperature, and the outer side, or cold side, must be below or near the composite maximum operating temperature, if the cooling ring 102 is present to contribute to cooling. To provide the high thermal gradient, the structural insulation layer may have the cooling ring 102 in the form of an air-cooled fins array that generates a radial heat flux, and the thermal barrier 103 being a low-conductivity layer or coating applied between the blades 104 and the cooling ring 102. The thermal barrier 103 must be strong in compression to transmit the centrifugal loads from the blades 104 to the cooling ring 102, and sufficiently compliant to follow the structural and thermal expansion of the cooling ring 102.

Figure 2:
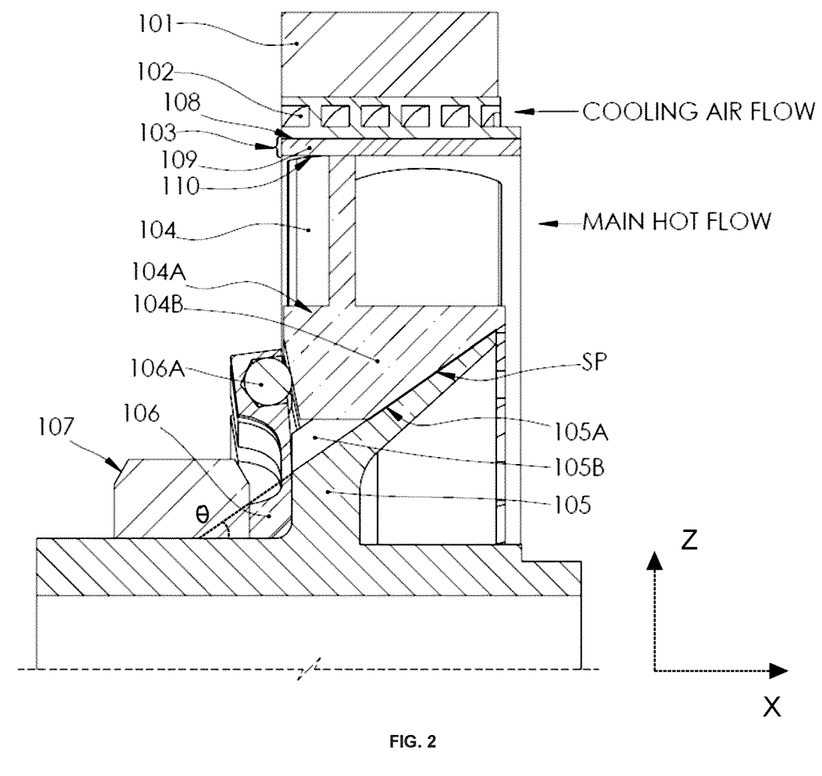
FIG. 2 is a cutaway view of the rim-rotor turbomachine of FIG. 1.

Referring concurrently to FIGS. 1 and 2, the blades 104 of the rim-rotor turbomachine 100 may each include an inner shroud portion 104A and a blade root 104B. The blade roots 104B are connected to a hub 105 (also known as disc or disk), and a spring-mass retainer 106. The hub 105 may be connected to or may be part of a shaft, such as an output shaft. The individual blades 104 are retained by the hub 105 so as to be free to move radially to follow the radial expansion of the rim-rotor turbomachine 100 under rotation. The blades 104 maintain radial contact at their tips with the outer shroud (i.e., ring 101, the cooling ring 102, the thermal barrier 103). The rim-rotor turbomachine 100 maintains its integrity under rotation and transfers the power to the turbine drive shaft connected to the hub 105 by having the blades 104 maintain a contact with the hub 105. The rim-rotor turbomachine 100 may maintain suitable rigidity achieved by forcing the blades 104 to move following a sliding plane SP between the blade roots 104B and a bottom surface 105A of hub slots 105B. The expression "plane" is used as the surfaces SP shows a rectilinear path in the figures, but the surfaces SP may be viewed as forming a frusto-cone, or flat segments distributed on a frusto-cone. The sliding planes SP are angled from the rotational axis X which results in a preselected axial blade movement based on the radial displacement. A minimum angle may be based on the static coefficient of friction between the blade 104 and the material of the hub 105 to ensure the blade 104 will not jam on speed ramp down. A high angle reduces the static friction necessary at maintaining a high rigidity under dynamic vibration. Therefore, angles θ between 15 and 75 degrees are possible depending on materials and rigidity needs, with a contemplated value of 35 degrees providing sufficient margin on the static friction to avoid ceasing on rotational speed ramp down while ensuring the static friction is sufficient to avoid sliding due to unbalance forces.

To maintain the blade root 104B in contact with the sliding plane SP, an axial force may be applied on the blade 104, such as on a blade root backface. This axial force is created by the spring-mass retainer 106 in contact with the blade root 104 and with a retainer part 107, such as for instance a nut, or like abutment surface connected to the hub 105. The spring-mass retainer 106 imparts a spring effect resulting in an axial force on the blade roots 104B. To allow an axial relative position and motion of the blades 104 while maintaining contacts, the spring-mass retainer 106 may include radial cuts creating individual beam springs per blade, the beam springs projecting from a common spring-mass center ring. As the rim-rotor turbomachine 100 starts rotating, the blades 104 start moving axially, thereby reducing the spring preload. To ensure sufficient force is maintained on the blade roots 104B during high rotational speed, offset masses 106A may be added at the end of the spring beams, creating an angle between the spring head center of mass and the radial axis (in the Y-Z plane), and resulting in an increase of axial force on the blade root 104B when rotational speed increases. To ensure sufficient force is applied by the spring-mass during rotation, the mass head may be for example between 10 and 50% of the blade 104 with which it makes contact. The angle between the spring head center of mass and the radial axis may be between 3 degrees and 30 degrees. An angle of 15 degrees is well suited as it limits the radial forces being transferred while creating sufficient axial forces to maintain suitable assembly rigidity.

In an embodiment, the rim-rotor turbomachine 100 uses oxidation-resistant materials at gas temperature above 900 degrees C., such as ceramics for the blades 104 with compressive loading where maximal tensile stresses are at 40% or less than the maximal compressive stresses. The blades 104 will conduct a large heat flux to the components in thermal communication. Due to the low centrifugal forces experienced by the hub 105, the hub 105 can be made of an oxidation-resistant material at gas temperature above 900 degrees C., with a tensile strength above 100 MPa at temperature above 900 degrees C. (e.g., ceramics and/or ceramic-metal matrix composites and/or ceramic-matric composites, as compared to metallic alloys). In cases where small axial displacements are made possible (for example when a high-angle sliding plane angle is used), the low flexibility requirement of the spring-mass may allow the spring-mass retainer 107 to be made of high temperature materials like ceramic. In the depicted case, where higher flexibility of the spring component may be required due to the lower sliding plane angle, a metallic material, such as a nickel or titanium super-alloy providing sufficient strength and oxidation and creep resistance, can be used. An insulation piece or layer may be provided between the spring-mass retainer 107 and the blade roots 104B, such as a ceramic coating, or a low conductivity ceramic pad or ball, thereby reducing the spring-mass air cooling requirement. The insulation has a secondary benefit of increasing the resistance to lateral friction at the contact point between the spring-mass retainer 107 and the blades 104 by increasing the hardness by at least 50%.

In a specific embodiment, the thermal barrier 103 may include a coating referred as Thermal Barrier Coating (TBC). The TBC is applied on the inner face of the cooling ring 102, effectively reducing both the conduction between the blades 104 and the cooling ring 102 and the heat transfer by convection between the hot gases flowing through the blades 104 and the cooling ring 102. The thermal barrier 103 may include various layers (the layers being for instance annular), such as a bond coat 108, a top coat 109 and a low-friction coat 110. The thickness of the thermal barrier 103 is selected to provide sufficient thermal insulation while limiting the added weight that would add to the supporting annular structure of the rim-rotor turbomachine 100. The density, the thermal conductivity and the compressive strength of the thermal barrier are therefore important characteristics to provide adequate rim-rotor turbomachine performance. The top coat 109 may be a ceramic top coat with different base materials and mixtures. In a variant, the top coat 109 is yttrium-stabilized-zirconia (YSZ). In another variant, the top coat 109 may be yttrium aluminum garnet (YAG). In an embodiment, the top coat 109 has thickness of 300 µm up to 1500 µm, inclusively, though the thickness of the top coat 109 may be outside this range as well. The top coat 109 may have a porosity level between 10 and 30%, inclusively. If the top coat 109 is a YSZ coat, a density may range between 4.2 and 5.5 g/cc inclusively, while the range of density for a top coat of YAG is 25% lower than that of the YSZ coat, between 3.2 and 4.2 g/cc inclusively. Properties suitable are a thermal conductivity of around 1 W/Km, a mechanical compressive strength of at least 500 MPa and a minimum strain of 0.5% before cracking/spalling to limit heat conduction and resist mechanical stresses. To improve adhesion of the top coat 109 to the base material of the cooling ring 102 and/or to increase corrosion resistance, the bond coat 108 may be applied, as for example a bond coat of MCrAlY (Nickel/Cobalt-Chrome-Aluminium-Yttria), NiAl (Nickel-Aluminium) or other mixtures. A thickness of the bond coat 108 may range from 75 to 150 µm, inclusively. The bond coat 108 applied may have a 5 to 15% porosity, inclusively, to provide strain resistance, to better match thermal elongation of the top coat 109 relative to the cooling ring 102, and to increase the adhesion of the top coat. The coatings used for the bond coat 108 and/or top coat 109 can be applied by different methods, for example air plasma spray (APS), high velocity oxygen fuel (HVOF) or physical vapor deposition (PVD), providing a layer of porous material. The structure of the layer of bond coats 108 and/or top coat 109 are arranged in order to provide sufficient compression resistance for the compressive loads associated with operation of the rim-rotor turbomachine 100.

In a specific embodiment, an additional layer is part of the thermal barrier 103, radially inward of the top coat 109. The additional layer is of low-friction dry lubricant 110 applied to reduce the friction coefficient between the tip of the blade 104 and the surrounding annular structure. Indeed, due to mismatch in thermal expansion between the blades 104 and the supporting annular structure, sliding may be required to reduce the tensile stresses in the blades 104 imposed by thermal conditions. Reducing the coefficient of friction at the blade tip with a dry lubricant coating layer 110, such as boron nitride or other dry lubricants, may reduce blade stresses and hence increase a durability of the blades 104. The dry lubricant coating layer 110 may be applied by aerosol, painting, air plasma spray or by other methods. A thickness of the layer 110 may range from 25 to 100 µm, inclusively, though the thickness of the layer 110 may be outside of this range. As this coat 110 is at the interface between the blades 104 and the surrounding annular structure, application of the anti-friction coat may be localized at the blade contact, or even directly applied on the blade tip, discrete separate zones. Therefore, the layer 110, if present, may not be continuously annular.

In another embodiment, the cooling ring 102 and the thermal barrier 103 may both be made with a TBC, where if required, fins would be made within the TBC itself. Hence, the cooling ring 102 and the thermal barrier 103 could also form a single part made from TBC. The expression "fins" pertains to surfaces separated by void enabling air impingement for cooling. Other expressions that could be used to define such features include channels, heat-exchange surfaces, concavities, walls, etc. The geometries of the fins are designed to create an increased heat exchange surface area with the cooling air while being large enough to support the compressive loading. The fins may be continuous or cut along the flow path, possibly resulting in an array of pins in specific arrangement. The passage area created between adjacent fins (channel width) may vary along the channel line to control pressure losses and heat transfer. A width of a channel or space between fins may be 200 to 800 µm, inclusively, as an example. Fins of 500 to 2000 µm may be used, inclusively, and as an example. The channels may go from axial face to axial face of the cooling ring 102, whether in a straight path or a helical path. The channels define the fins, the fins separating the channels.

In another variant, the cooling ring 102 may be made of high strength composite material, possibly joined within the outer composite rim 101, with the thermal barrier 103 applied at the inner circumference. Stated differently, the cooling ring 102 could be part of the composite rim 101, for instance by having the same material. Suitable materials include carbon-fiber-polymer composite such as high modules and/or high strength carbon fiber and high temperature polymer (e.g., cyanate ester, polyimide, phtalonitrile).

In another variant, the cooling ring 102 may be made from a metallic annular part where the array of fins, such as for example defined on the outer surface of the cooling ring 102, are made in insulating material such as a TBC (YSZ, YAG, etc), effectively creating low conductivity fins. A possible manufacturing method would be to apply a TBC on both surfaces of the metallic annular part and machine channels in the outer TBC layer to create the fins or like heat-exchange surfaces. Another metallic layer could be introduced between those TBC fins and the composite rim 101 for structural integrity.

Ceramic material for the blades 104 is selected to operate at high temperature, supporting stresses at temperatures higher than metallic blades. In case the blade temperature exceeded the oxidative or corrosion limits of the ceramic, environmental barrier coatings (EBC) could be applied on the blade surfaces in contact with the hot gases.

Figure 3:
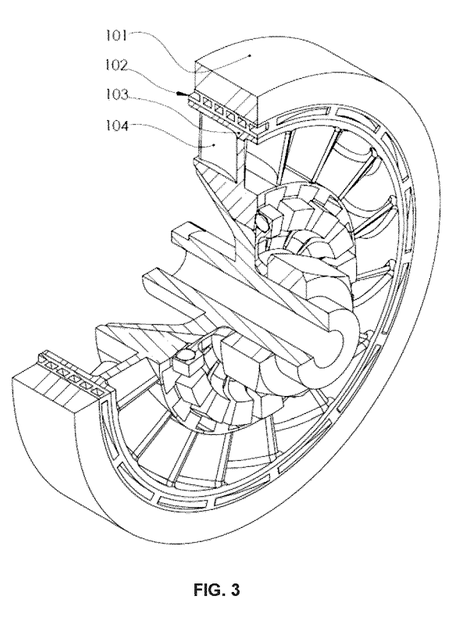
FIG. 3 is a perspective view, partly sectioned, of a rim-rotor turbomachine using a rim-rotor, insulation substrate, ceramic blades with a sliding plane below the root, a matching sliding plane hub and a spring-mass retainer; where a thermal barrier coating has a variable thickness, in accordance with another aspect of the present disclosure.
Figure 4:
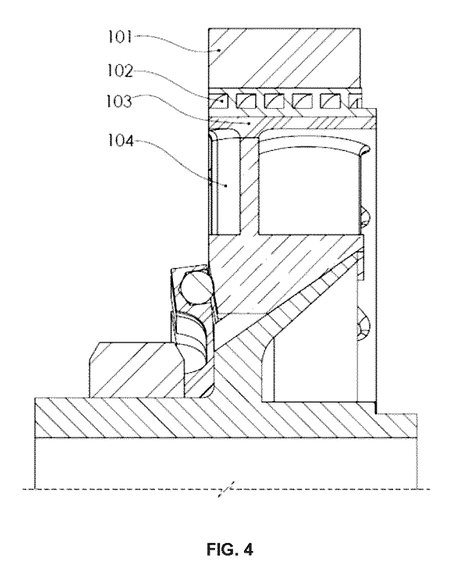
FIG. 4 is a cutaway view of the rim-rotor turbomachine of FIG. 3.

The thermal heat flux reaching the cooling ring 102 are from two main sources, by the conduction from the blades 104, and by the hot gas convection with the exposed surface of the supporting annular structure between the blades 104. The thickness of the thermal barrier 103 may be uniform as shown in FIGS. 1 and 2 (i.e., constant radial thickness). The thermal barrier 103 may also have a different thickness at the tip of the blades 104 versus a thickness on the remaining surfaces as shown in FIGS. 3 and 4. The thermal barrier 103 may be thicker (i.e., in the radial direction) at the interface with the blade tips 104. Depending on the required thickness at each location, additional TBC could also be applied to the blade tips directly. When provided as part of the thermal barrier 103, a locating feature may be defined by the thicker TBC for the thermal barrier 103 for the blade tip. A recess may also be present in the TBC of the thermal barrier 103 vis-à-vis the blade tip, effectively creating a seating region for the blade tip 104.

Figure 5:
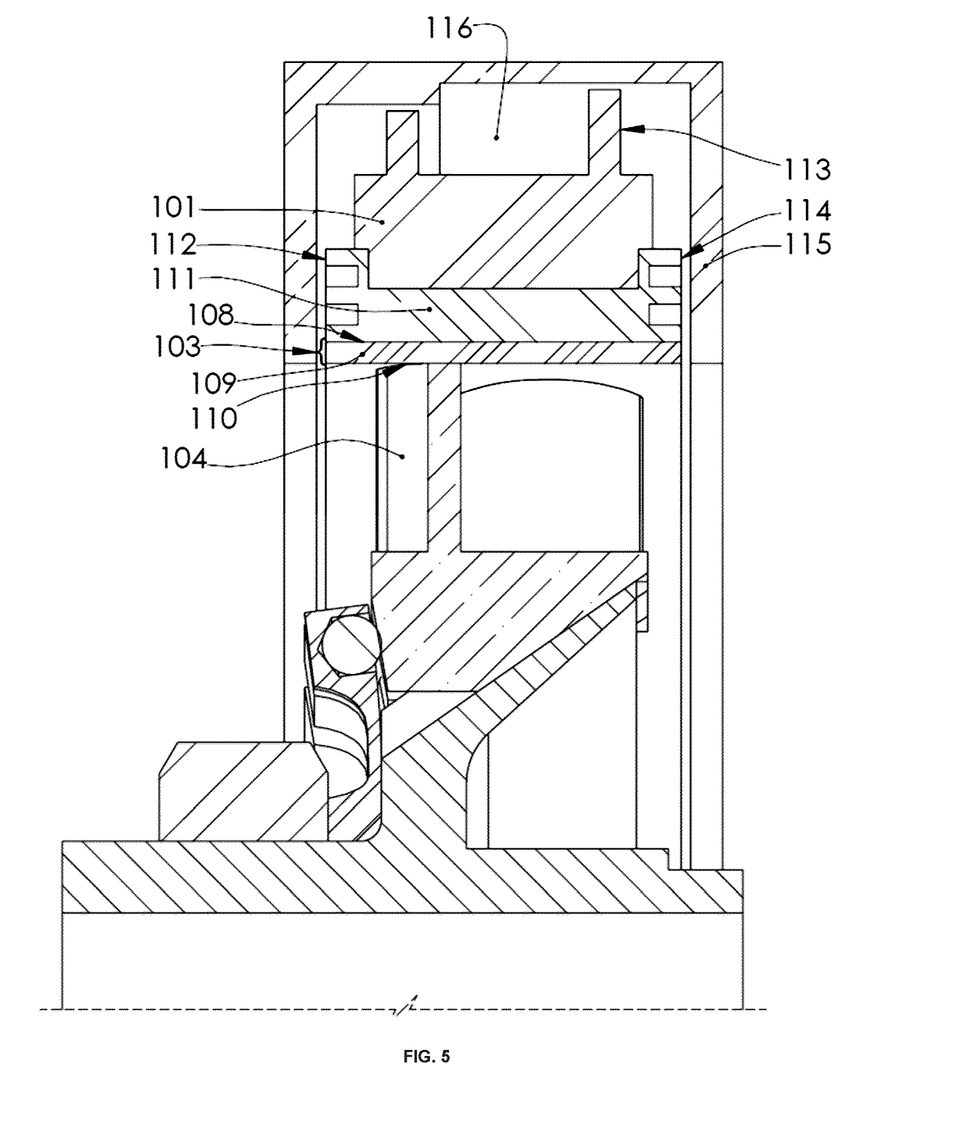
FIG. 5 is a cutaway view of a variant of a rim-rotor turbomachine using a rim-rotor, insulation substrate, ceramic blades where the thermal barrier is applied directly on a conductive dense material.

Referring to FIG. 5, the thermal barrier 13 can be applied on a dense thermally conductive material 111 placed radially inward of the composite rim 101, used as or as alternative to the cooling ring 102. The conductive material 111 may be in the form of an annular structure, with no air flow through it, but rather around it. The dense conductive material 111 conducts the heat to fins 112, 114 towards the front, back and/or radially outwards 113 of the rim-rotor turbomachine 100. The heat is then evacuated to the surrounding environment through heat dissipation via the fins. The fins can also be used as lips of labyrinth seals between the rotor and a turbine static casing 115 to seal a rim cavity 116. Heat can be evacuated to air and/or through surrounding cooled casing fixed fins (not shown). The dense conductive material can be a metallic, ceramic or composite material. The thickness of the conductive material may be generally around half the thickness of the rim-rotor ring and depends on the number of fins required to extract the heat. Each axially extending fin is typically 1 to 2 mm thick, as an example. To limit centrifugal forces, materials combining high conductivity and lightweight are of interest. The annular structure of conductive material 111 may be made of pitch-based carbon-fibers or silicon-carbide fibers with a conductive matrix, of high temperature aluminum, or of metal-matrix composite such aluminum-beryllium, as examples among others.

Figure 6:
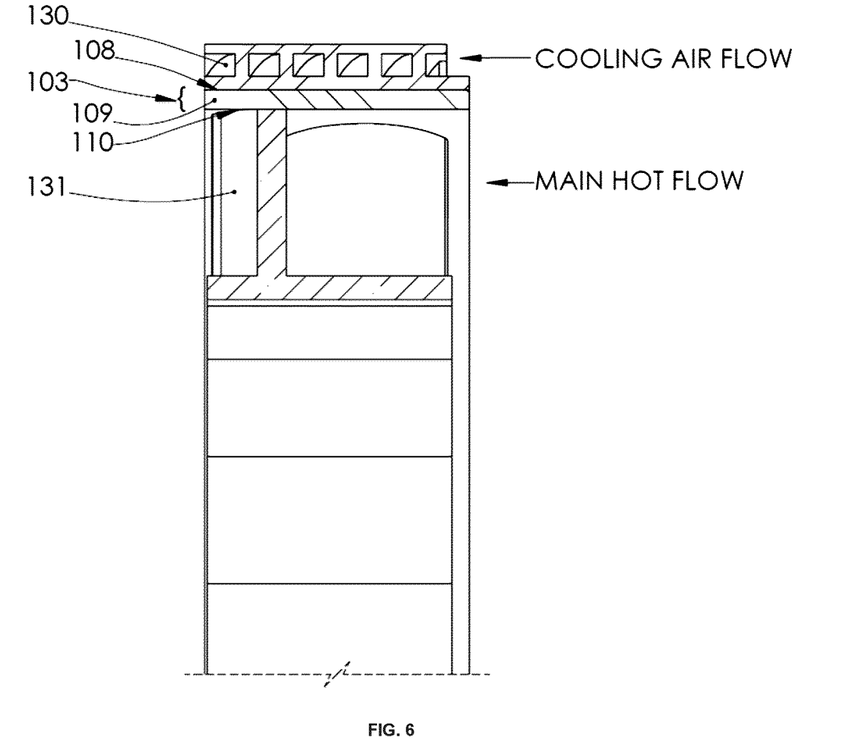
FIG. 6 is a cutaway view of a non-rotating turbomachine structure having guide vanes in which a thermal barrier is located between the vanes and a surrounding annular support.

Referring to FIG. 6, the thermal barrier 103 may be also used for non-rotating components to insulate an annular structural support component 130 from heat conducted through guide vanes (i.e., static blades) 131 and from convection with hot gases flowing between the vanes 131. The annular structural support component 130 may be a static component, and may be made of any appropriate material, such metallic material, composites, etc. The thermal barrier 103 may include the top coat 109, and optionally the bond coat 108 and/or the anti-friction coat 110 as describe above. A top coat thickness between 2 and 15% of the vane height may be used, depending on the material selected and thermal conditions. For example, this arrangement allows ceramic vanes to operate at elevated temperatures approaching the hot gases temperature while having a structure requiring a relatively low amount of cooling air, to be maintained below its maximum usage temperature (example below 900° C. for nickel super-alloy). The thermal elongation of the vanes 131 and structural support 130 at the operating temperature, which may be adjusted by design based on the thickness of the thermal barrier 103, may be adjusted to generate a loading of the vanes 131 that is mostly in compression by having more radial thermal elongation at the vanes 131 than at the structural support 130. The cooling of the structural support 130 may be made via air cooled fins, defining the internal channels as shown, and/or by air cooled external fins (not shown) and/or by conduction through the connected adjacent components.

Figure 7:
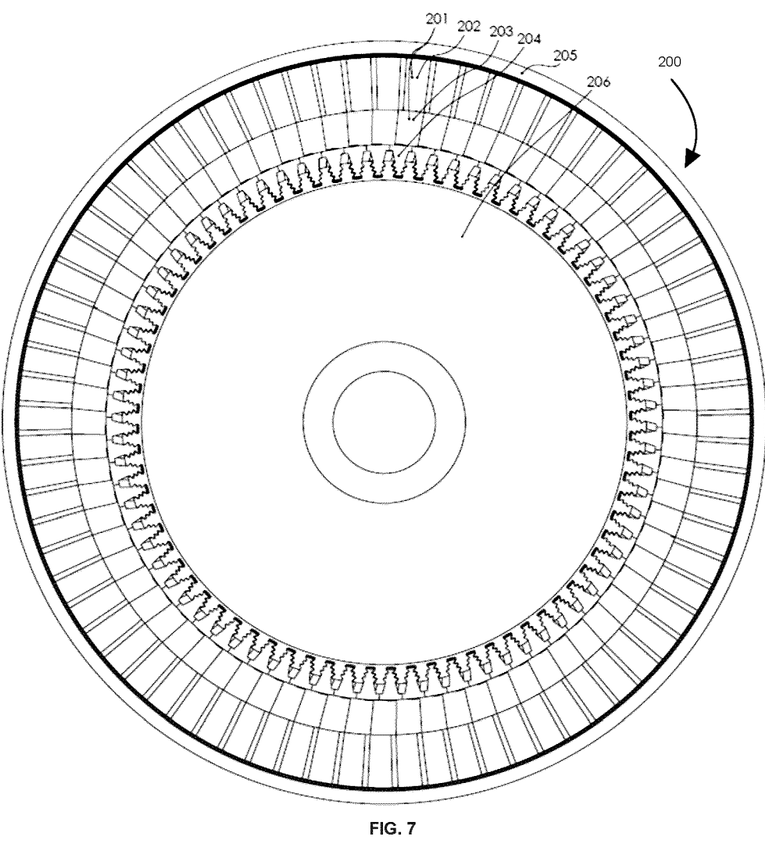
FIG. 7 is an axial view of a variant of a rim-rotor turbomachine using a rim-rotor, insulation substrate, two-part blades with a sliding feature.
Figure 8:
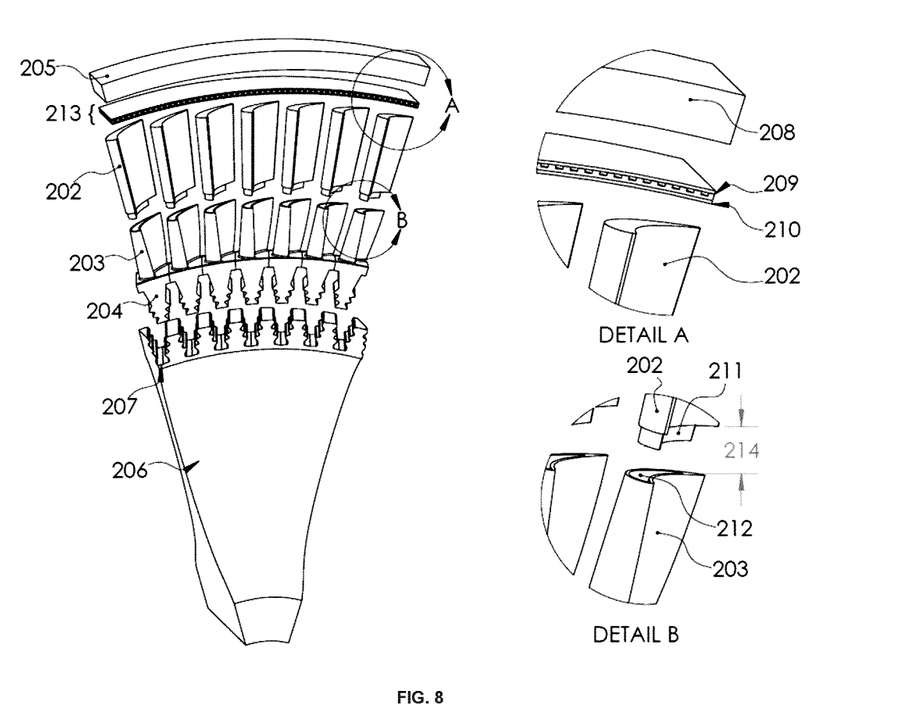
FIG. 8 is an exploded view of the two-part blades of FIG. 7.

Referring to FIGS. 7 and 8, a variant of the rim-rotor turbomachine is shown at 200. In the rim-rotor turbomachine 200, an alternative structural arrangement may be used to support the centrifugal inertia forces of blades 201, as an alternative to the sliding plane configuration of FIGS. 1 to 6. Each blade 201 may be segmented in two or more sections.

For simplicity, a two-segment blade will be described and may be composed of a superior blade segment 202, i.e., radially outward, and an inferior blade segment 203, i.e., radially inward. The superior blade segment 202 may be made of ceramics, high temperature metallic alloy, or the like. The superior blade segment 202 may be supported by the peripheral annular structure defined by a high-strength composite rim-rotor 205, that may have the same construction as for the embodiments of FIGS. 1 to 6. The inferior blade segment 203 may be retained in tensile loading by its root 204 transferring the tensile loading to the hub 206 through a matching root feature 207, shown for example as fir tree roots. The roots design and retaining features may vary, using locking plates, shank seals, locking screws, retailing pins (not shown) and/or other type of retaining feature. The superior blade segments 202 and inferior blade segments 203 may be connected together with a sliding feature that may allow relative radial movement between the two while transferring aerodynamically produced torque from the superior segment to the hub 206. The sliding feature may have different geometries, such as a reduced blade cross-section 211 and matching imprint 212, or may have a variety of pin-and-socket approach or other connecting feature. Therefore, the sliding feature is a joint that allows an expansion or a contraction of the blade 201 in a radial direction. The joint may be described as a joint with one translational degree of freedom, a sliding joint, a telescopic joint. A gap 214 between the blade segments 202 and 203 may be required to allow the rim-rotor turbomachine 100 to operate in a wide range of material temperatures and rotational speeds without overloading the rim-rotor 205. The initial gap 214 may be sized to achieve an operational gap near zero for the operating temperature and design speed of the rim-rotor turbomachine 100.

Referring to FIG. 8, the surrounding annular structure may include an insulated layer 213 between the blades 201 and the rim-rotor 205 to protect the rim-rotor 205 from the heat of the blades 201. The insulated layer 213 may include a cooling ring 209 that may have an air-cooled fins array, and/or that may be made from a dense conductive material similar to the one of FIG. 5. If high insulation performance is required, a thermal barrier 210 may be radially inward of the cooling ring 209. The thermal barrier 210 may include the various coats as described above. In some embodiments, as in FIGS. 7 and 8, or as in FIGS. 1 to 6, the air-cooled fins array may be a continuous ring component, or an assembly of segmented ring portions. With specific material selection, the ring 209 of air-cooled fins array or of ring segments and the superior blade segments 202 may be joined together by welding, brazing, or other methods, as a possibility among others.

Figure 9:
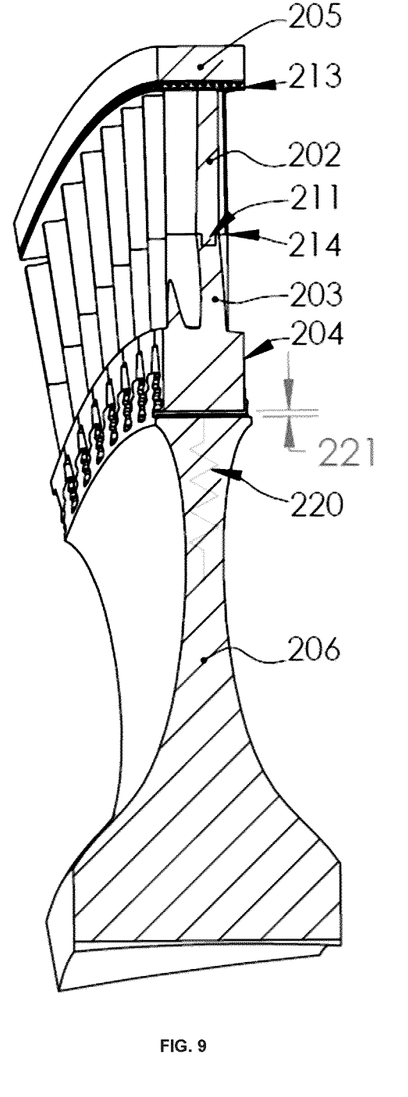
FIG. 9 is a cutaway perspective view of the two-part blades of FIGS. 7 and 8 with a spring-mass retainer under root.

FIG. 9 shows a portion of the cut view from the rim-rotor turbomachine 200. A radial gap 221 is defined between the blade roots 204 and the hub matching root features 207 may allow the inferior blade segments 203 to move inward when the rim-rotor turbomachine 200 is still hot and the rotational speed is decreased toward a stop. A biasing member 220, such as a compliant spring element, may be inserted between the blade root 204 and the hub 206 to maintain the rigidity of the assembly during low speed operation and at rest. The biasing member 220 may be a coil spring, a leaf spring, as examples among others.

Figure 10:
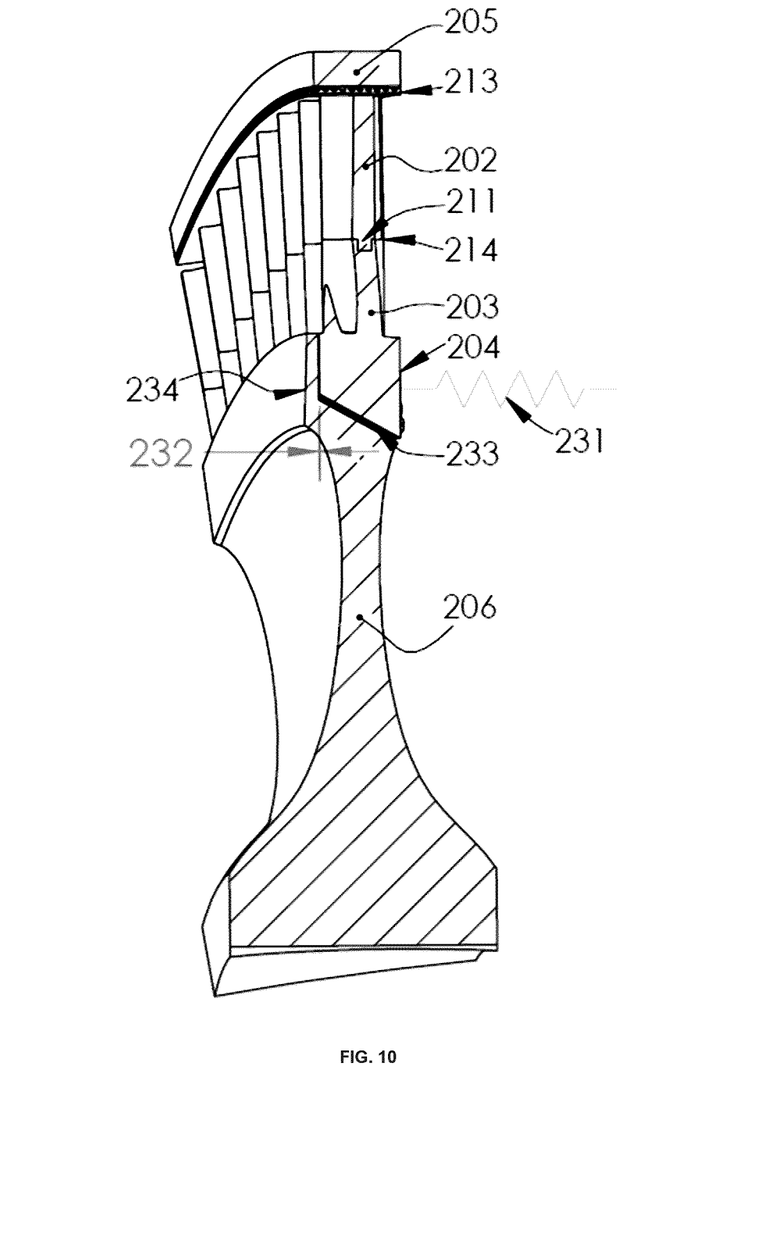
FIG. 10 is a cutaway perspective view of a variant of a rim-rotor turbomachine using a rim-rotor, insulation substrate, two-part blades with a sliding plane below a root, a matching sliding plane hub and a spring-mass retainer.

FIG. 10 depicts an alternative embodiment for the inferior blade root 204. In this embodiment, the blade retaining features (e.g., root fir trees) and the hub matching root features 207 may be angled relative to the rotational axis X so as to give additional radial displacement capability for the blades 201. At rest, the radial gap 214 between the superior blade segments 202 and the inferior blade segment 203 may be null, and the inferior blade lower surface may be in contact with hub sliding plane 233 (as above, the sliding plane 233 may be frusto-conical, etc), while a biasing member 231, such as a compliant spring element may maintain the rigidity of the assembly by exerting an axial force on the blade roots 204 to generate a normal force at the sliding plane 233. As the turbine is accelerated, the rim-rotor 205 may radially expand due to centrifugal forces, and with the biasing force on their roots, the blades 204 may slide up the sliding plane 233. The initial axial gap 232 may therefore be reduced until the blade roots 204 come in contact with an axial retaining abutment 234, at which point the inferior blade segments 203 may be then retained only in tension by its roots 204, and the radial gaps 214 begin increasing. The axial retaining abutment 234 may for instance be part of the hub 206, or may be a separate ring as well. The additional radial displacement capability may be required for the hot soak of the rim-rotor turbomachine 200, where the thermal expansion of the components may be large, but the radial displacement of the rim-rotor 205 due to centrifugal loads is null. With the sliding planes 233, the blades 201 may therefore move sufficiently freely radially, to avoid unnecessary loading of the blades 201 in compression.

Figure 11:
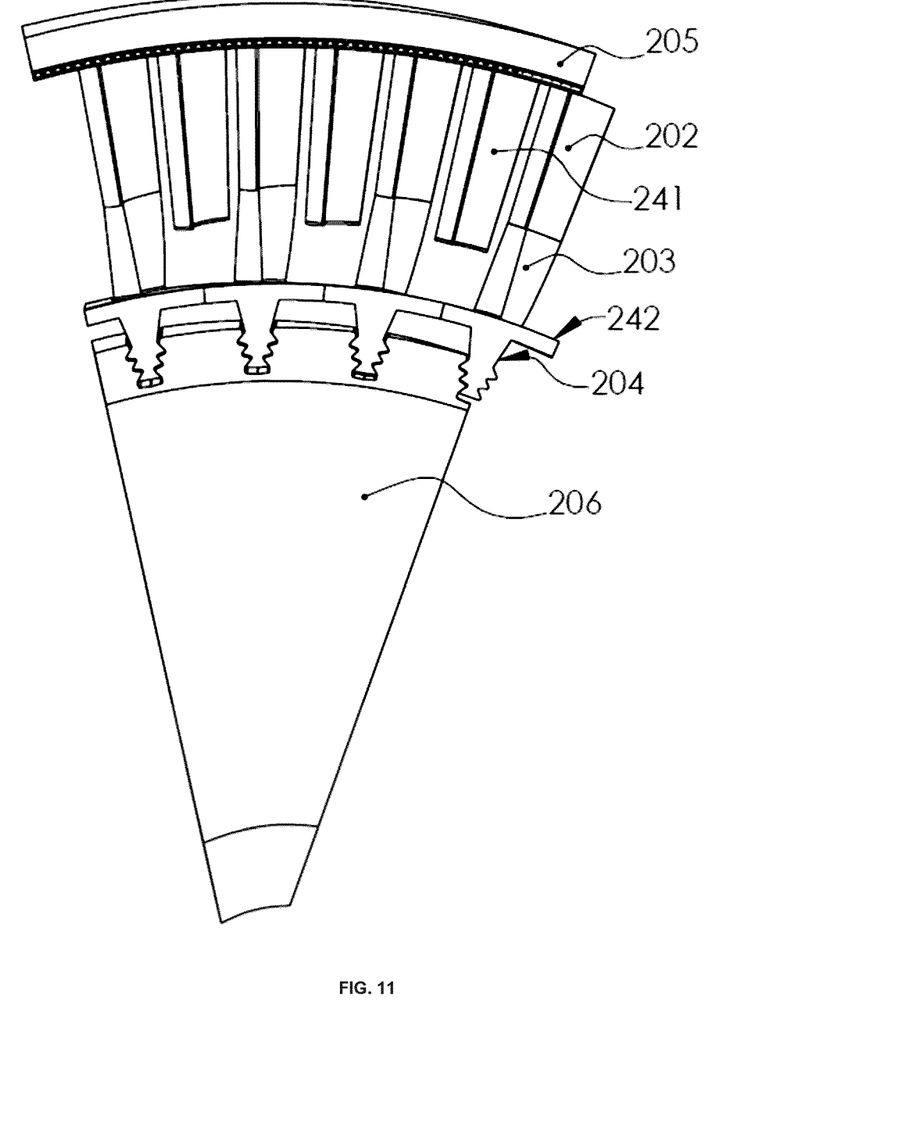
FIG. 11 is a cutaway axial view of a variant of a turbine wheel where an inferior blade section count is reduced and with additional blades added between superior blade segments.

Referring now to FIG. 11, an embodiment of the rim-rotor turbomachine 200 is shown, in which the number of inferior blade segments 203 is reduced to decrease the loading of the hub 206, with a view to extending its life expectancy and increasing its maximum speed. To maintain the aerodynamic capability of the rim-rotor turbomachine 200, additional blades 241 may be retained solely by the surrounding annular structure featuring the rim-rotor 205, and are added between the superior blades segment 202. Stated differently, the rim-rotor turbomachine 200 in FIG. 11 has an alternating sequence of blades 201 (featuring segments 202 and 203) and blades 241. The lower platform 242 of the inferior blade segments 203 may therefore extended circumferentially to maintain an adequate flow passage, forming an inner shroud. The blades 241 may be connected to the rim-rotor 205, to the cooling ring 209, to the thermal barrier 210.

The superior and inferior blade segments 202 and 203, respectively, may be made from different materials, such as metallic super-alloys, monolithic ceramics, ceramic matrix composites (CMCs) or any other appropriate material. For an application in a gas turbine where the gas temperature is above the operating temperature of the blades 201, blade cooling may be necessary. In-blade convective cooling with cooling air flowing through the blades 201 can be used, i.e., with the blades being hollow for air to circulate therein. A thermal barrier coating may be applied on the outer surfaces of the blades to further increase the cooling effectiveness, and therefore the inlet temperature capability of the rim-rotor turbomachine 200. For the superior blade segment 202, cooling air may be routed from the air-cooled fins of the cooling ring 209 to the blade internal cooling passages. Air may exit the blades 201 with small holes to create film-cooling around the blade surface and further extend the cooling system effectiveness.

In a first aspect, the present disclosure provides a gas turbine that uses a rim-rotor configuration to allow the use of ceramics under compression. The rim-rotor turbine comprises a high-strength composite rim-rotor, an insulating layer made of ceramic or metallic alloy or composite material, ceramic or high temperature alloy aerodynamic blades, and a hub. A thermal barrier coating (TBC) is used at the interface of the blades and the outer supporting structure to reduce the heat flux going towards the composite rim-rotor.

In a second aspect, the present disclosure provides a gas turbine configuration that uses a rim-rotor configuration to allow the use of ceramics under compression. The rim-rotor turbine comprises a high-strength composite rim-rotor, ceramic or high temperature insulating layer, ceramic or high temperature alloy aerodynamic blades, and a hub allowing sliding and/or relative movement of the blades and/or deformation of the hub. A TBC is used to reduce the cooling mass flow in the insulation layer. The TBC may have an over thickness at the interface with blade tips, for further insulation from the heat conducted from the ceramic blades.

In a third aspect, the present disclosure provides a gas turbine configuration that uses a rim-rotor configuration to allow the use of extended turbine blade. The rim-rotor turbine comprises a high-strength composite rim-rotor, ceramic or high temperature insulating layer, ceramic or high temperature alloy aerodynamic blades, and a hub, where the blades are supported by both the base and the tip. The superior portion of the blade is supported by the outer rim-rotor through compressive loading, and the hub supports the inferior section of the blade by tensile loading. This configuration allows an increase in both the blade length and tip speed compared to state-of-the-art turbines.

The variants described herein for the rim-rotor turbomachine 100 and rim-rotor turbomachine 200 may enable the increase of the working fluid temperature in Brayton cycles and variants, to achieve high efficiency and high power density.

What is claimed is:

1. A rim-rotor assembly comprising:
an annular structure including a composite rim;
a hub;
blades projecting from the hub, tips of the blades contacting the annular structure, the blades configured to be loaded in compression against the annular structure; and
a thermal barrier in the annular structure, the thermal barrier being continuous and defining at least part of a radially inward surface of the annular structure, radially-outward surfaces of the tips of the blades contacting the thermal barrier, the thermal barrier being a thermal barrier coating.

2. The rim-rotor assembly according to claim 1, wherein the annular structure includes a cooling ring between the composite rim and the thermal barrier.

3. The rim-rotor assembly according to claim 2, wherein the cooling ring defines cooling channels.

4. The rim-rotor assembly according to claim 1, wherein the blades are connected to the hub by sliding joints, and are biased into compression against the annular structure.

5. The rim-rotor assembly according to claim 1, wherein the blades have a bottom segment connected to the hub, and a top segment against the annular structure, the bottom segment and the top segment interconnected by a translational joint.

6. The rim-rotor assembly according to claim 1, wherein the composite rim includes carbon fibers in a matrix.

7. The rim-rotor assembly according to claim 1, wherein the thermal barrier coating includes a layer of yttrium-stabilized-zirconia or of yttrium aluminum garnet.

8. The rim-rotor assembly according to claim 7, wherein the layer is of yttrium-stabilized-zirconia, and has a density between 4.2 and 5.5 g/cc inclusively.

9. The rim-rotor assembly according to claim 7, wherein the layer is of yttrium aluminum garnet, and has a density between 3.2 and 4.2 g/cc inclusively.

10. The rim-rotor assembly according to claim 7, wherein the thermal barrier includes a bond layer between the layer and a remainder of the annular structure, the bond layer having a thickness ranging between 75 to 150 μm inclusively.

11. The rim-rotor assembly according to claim 7, wherein the thermal barrier includes a bond layer between the layer and a remainder of the annular structure, the bond layer being MCrAlY or NiAl.

12. The rim-rotor assembly according to claim 7, wherein the thermal barrier includes a bond layer between the layer and a remainder of the annular structure, the bond layer having a porosity ranging between 5 to 15% inclusively.

13. The rim-rotor assembly according to claim 1, wherein the thermal barrier is continuously annular.

14. The rim-rotor assembly according to claim 13, wherein the thermal barrier has a uniform thickness.

15. The rim-rotor assembly according to claim 13, wherein the thermal barrier has a non-uniform thickness.

* * * * *